J. BRYAN.
TREE-PROTECTOR.

No. 174,114. Patented Feb. 29, 1876.

UNITED STATES PATENT OFFICE.

JOHN BRYAN, OF NEW HAVEN, CONNECTICUT.

IMPROVEMENT IN TREE-PROTECTORS.

Specification forming part of Letters Patent No. 174,114, dated February 29, 1876; application filed November 30, 1875.

*To all whom it may concern:*

Be it known that I, JOHN BRYAN, of New Haven, in the county of New Haven and State of Connecticut, have invented a new Improvement in Tree-Protectors; and I do hereby declare the following, when taken in connection with the accompanying drawings and the letters of reference marked thereon, to be a full, clear, and exact description of the same, and which said drawings constitute part of this specification, and represent, in—

Figure 1:
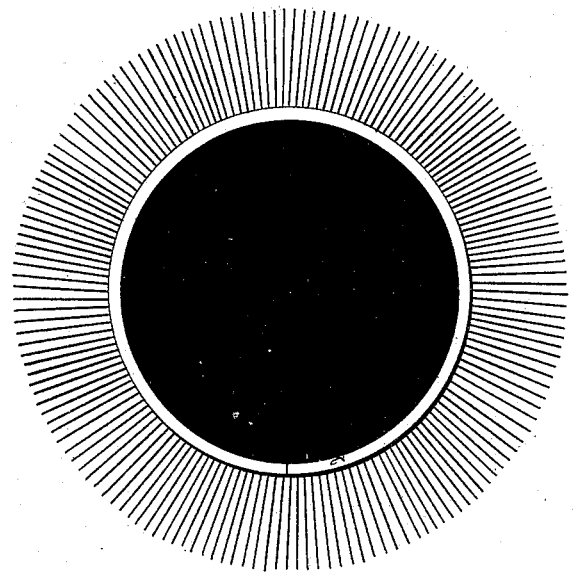
Figure 2:
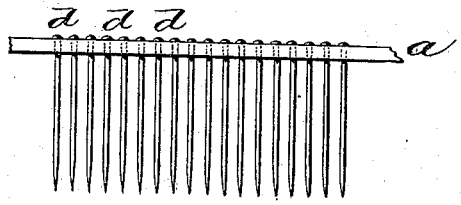

Figure 1, plan showing the device as applied to the tree; Fig. 2, a strip of the protector enlarged.

This invention relates to a device to be placed around the trunk of a tree to prevent the ascent of the moth to deposit the eggs which hatch the canker-worm, and which are so destructive to the foliage. The invention consists in a strip of flexible material, with a succession of pointed pins through the strip, so that when the strip is placed around the tree the pins will project radially therefrom and offer such an obstruction as to prevent the ascent of the insect.

$a$ is a strip of leather, rubber, felt, or other suitable flexible material, through which, in as close proximity as conveniently can be, common or other suitable pins, $d$, are inserted from the back side, the points projecting all in the same plane.

From such a strip the length required to surround the tree is cut and secured to the tree, so as to make a continuous roll of radially-projecting pins around the tree, as indicated in Fig. 1. These pins are placed so near together that the insect cannot pass between them, and the sharp points offer such an obstruction that the insects cannot pass over them; hence, with the tree thus protected, it is impossible for the insect to pass above the protector.

I do not wish to be understood as broadly claiming a flexible band as a tree-protector, when the said band is provided with a brush-like or bristle outer surface, as such, I am aware, is not new.

I claim—

The herein-described tree-protector, consisting of the flexible strip $a$, with a succession or single row of pointed pins inserted and projecting therefrom, substantially as described.

JOHN BRYAN.

Witnesses:
 JOHN E. EARLE,
 CLARA BROUGHTON.